US009431896B2

(12) United States Patent
Ye

(10) Patent No.: US 9,431,896 B2
(45) Date of Patent: Aug. 30, 2016

(54) APPARATUS AND METHOD FOR ZERO VOLTAGE SWITCHING IN BRIDGELESS TOTEM POLE POWER FACTOR CORRECTION CONVERTER

(71) Applicant: Texas Instruments Incorporated, Dallas, TX (US)

(72) Inventor: Zhong Ye, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/565,541

(22) Filed: Dec. 10, 2014

(65) Prior Publication Data

US 2015/0180330 A1 Jun. 25, 2015

Related U.S. Application Data

(60) Provisional application No. 61/918,453, filed on Dec. 19, 2013.

(51) Int. Cl.
*H02M 1/42* (2007.01)
*H02M 7/5387* (2007.01)
*H02M 7/06* (2006.01)
(Continued)

(52) U.S. Cl.
CPC ......... *H02M 1/4208* (2013.01); *H02M 1/4225* (2013.01); *H02M 7/46* (2013.01); *H02M 2001/0058* (2013.01); *Y02B 70/126* (2013.01); *Y02B 70/1491* (2013.01)

(58) Field of Classification Search
CPC ........... H02M 1/4208; H02M 1/4233; H02M 1/4216; H02M 1/4225; H02M 1/4241; H02M 1/425; H02M 1/4258; H02M 1/4266; H02M 7/5387; H02M 7/06
See application file for complete search history.

(56) References Cited

U.S. PATENT DOCUMENTS 6,556,464 B2 * 4/2003 Sakai .................. H02M 1/4216
363/132
8,675,375 B2 3/2014 Xu et al.
(Continued)

FOREIGN PATENT DOCUMENTS

| CN | 203219195 | 9/2013 |
|---|---|---|
| RU | 2012117591 | 11/2013 |
| TW | 201240292 | 10/2012 |

OTHER PUBLICATIONS

Xue Chao et al., UCC28070 Implement Bridgeless Power Factor Correction (PFC) Pre-Regulator Design, Texas Instruments Application Report SLUA517, Jul. 2009, 13 pgs.
(Continued)

*Primary Examiner* — Timothy J Dole
*Assistant Examiner* — Sisay G Tiku
(74) *Attorney, Agent, or Firm* — William B. Kempler; Frank D. Cimino

(57) ABSTRACT

Power factor correction (PFC) apparatus, controllers, and methods for operating bridgeless totem pole power factor correction converters in which AC input voltage polarity is detected for designation of active and freewheeling switches of the totem pole circuit, a nominal freewheeling switch on-time is determined according to a Volt×Second balance relationship, and the voltage across the designated active switch is sensed and used to selectively modify or offset the nominal freewheeling switch on-time to provide a computed freewheeling switch on-time for the next switching cycle to facilitate zero voltage switching of the active switch.

20 Claims, 15 Drawing Sheets

(51) Int. Cl.
*H02M 7/46* (2006.01)
*H02M 1/00* (2006.01)

(56) References Cited

U.S. PATENT DOCUMENTS

| | | | |
|---|---|---|---|
| 8,749,217 B2 | 6/2014 | Ye | |
| 8,766,605 B2 * | 7/2014 | Ren | H02M 1/4225 323/207 |
| 8,779,746 B2 | 7/2014 | Ye et al. | |
| 2009/0196072 A1 | 8/2009 | Ye | |
| 2010/0118573 A1 * | 5/2010 | Saint-Pierre | H02M 1/4225 363/126 |
| 2011/0149622 A1 * | 6/2011 | Lin | H02M 1/4208 363/124 |
| 2011/0164437 A1 | 7/2011 | Sun et al. | |
| 2012/0026754 A1 | 2/2012 | Ye | |
| 2012/0051107 A1 * | 3/2012 | Choi | H02M 1/4208 363/126 |
| 2012/0069615 A1 * | 3/2012 | Tomioka | H02M 1/4208 363/126 |
| 2012/0092900 A1 * | 4/2012 | Orr | H02M 1/4208 363/21.03 |
| 2012/0200268 A1 | 8/2012 | Ye et al. | |
| 2013/0021827 A1 | 1/2013 | Ye | |
| 2013/0033240 A1 | 2/2013 | Ye | |
| 2013/0033904 A1 | 2/2013 | Ye | |
| 2013/0088895 A1 | 4/2013 | Ye et al. | |
| 2013/0155726 A1 | 6/2013 | Xu et al. | |
| 2013/0258731 A1 | 10/2013 | Xu et al. | |
| 2014/0035541 A1 * | 2/2014 | Jin | G05F 1/70 323/210 |
| 2014/0226375 A1 * | 8/2014 | Feno | H02M 7/219 363/44 |
| 2015/0280548 A1 * | 10/2015 | Shoyama | H02M 7/06 363/126 |

OTHER PUBLICATIONS

Totem Pole Bridgeless PFC Using GaN Transistors, Application Note, GaN Systems Inc., 2013, 6 pgs.
Application Note: TDPS500E2C1 Totem Pole PFC Evaluation Board, Transphorm, Hy-Line Power Components, TDPS500E2C1, Aug. 16, 2013, 19 pgs.
Huber et al., Performance Evaluation of Bridgeless PFC Boost Rectifiers, IEEE Transactions on Power Electronics, vol. 23, No. 3, May 2008, pp. 1381-1390.
Transition Mode PFC Controller, Texas Instruments, UCC28050, UCC28051, UCC38050, UCC38051, SLUS515F, Sep. 2002, Revised Mar. 2009, 31 pgs.
Zhou et al., 99% Efficiency True-Bridgeless Totem-Pole PFC Based on GaN HEMTs, PCIM Europe International Exhibition and Conf. for Power Electronics, Intleligent Motion, Renewable Energy and Energy Management; Nuremberg, May 14, 2013, 9 pgs.
PCT Search Report dated Apr. 9, 2015, 1 page.
TW201240292, English Machine Translation, 13 pages.
CN203219195, English Machine Translation, 7 pages.
RU2012117591, English Machine Translation, 4 pages.

* cited by examiner

US 9,431,896 B2

APPARATUS AND METHOD FOR ZERO VOLTAGE SWITCHING IN BRIDGELESS TOTEM POLE POWER FACTOR CORRECTION CONVERTER

REFERENCE TO RELATED APPLICATION

This application claims priority to, and the benefit of, U.S. Provisional Patent Application Ser. No. 61/918,453, filed on Dec. 19, 2013, entitled TOTEM POLE ZVS BRIDGELESS PFC CONTROL METHOD, the entirety of which application is hereby incorporated by reference.

BACKGROUND

Power factor correction (PFC) converters are often used as a front-end stage followed by a regulated DC-DC converter, with the PFC stage converting AC input power to provide a DC output voltage. Bridgeless PCF converters omit an input rectifier bridge and thus provide a cost effective and highly efficient power supply solution for many consumer products such as server and telecom power equipment, set-top boxes, televisions, displays, etc. Totem-pole type PFC circuits operating using transition mode switching provide the potential for high efficiencies, in which one switch operates as an active switch forming a primary current path with a diode or a return circuit MOSFET while a second totem pole switch operates as a freewheeling or synchronous switch, and the roles of the active and freewheeling switches changes as the input voltage switches between positive and negative polarities. The potential of high efficiency, however, is mitigated by non-zero switching of the active device, where active switch operation when the device voltage is greater than zero leads to switching loss and extra conduction losses are found when the active device is switched while the device voltage is negative. Gallium Nitride (GaN) totem pole devices offer certain benefits with respect to high-frequency switching speeds, low on-state resistance (RDSON) and low reverse-recovery charge, which can be employed to improve PFC efficiency. However, silicon-based MOSFET device types are more common, and improved control techniques and totem pole PFC systems are desired for improved efficiency without additional cost and process complexity associated with use of Gallium Nitride devices.

SUMMARY

Control techniques and circuitry are presented for bridgeless totem pole power factor correction converters to facilitate active switch zero voltage switching, where a nominal freewheeling switch on-time is determined according to a Volt×Second balance relationship in each switching cycle and is selectively adjusted or offset based on the voltage across the active switch for the next switching cycle. In certain embodiments, the freewheeling switch on-time is increased if the active switch voltage is above a threshold and is decreased for the next switching cycle if the active switch voltage is negative. In this manner, the control apparatus and methods of the disclosure facilitate regulation around zero voltage switching operation and zero current switching can be facilitated by selectively delaying turn on of the active switch until a negative active switch voltage returns to zero. AC input voltage polarity is sensed in certain embodiments and used to designate the active and freewheeling switches and for operating any included return circuit switches in each AC input half cycle. Certain embodiments provide for selective freewheeling switch on-time adjustment for interleaved multi-phase PFC converters based on sensing of a single-phase active switch voltage.

DESCRIPTION OF THE VIEWS OF THE DRAWINGS

The following description and drawings set forth certain illustrative implementations of the disclosure in detail, which are indicative of several ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings, in which:

FIG. 4 is a schematic diagram illustrating current flow in the PFC converter of FIG. 1 operating with a positive AC input with the active lower switch off and the upper freewheeling switch on;

FIG. 6 is a schematic diagram illustrating current flow in the PFC converter of FIG. 1 operating with a negative AC input with the active upper switch off and the lower freewheeling switch on;

DETAILED DESCRIPTION

Figure 1:
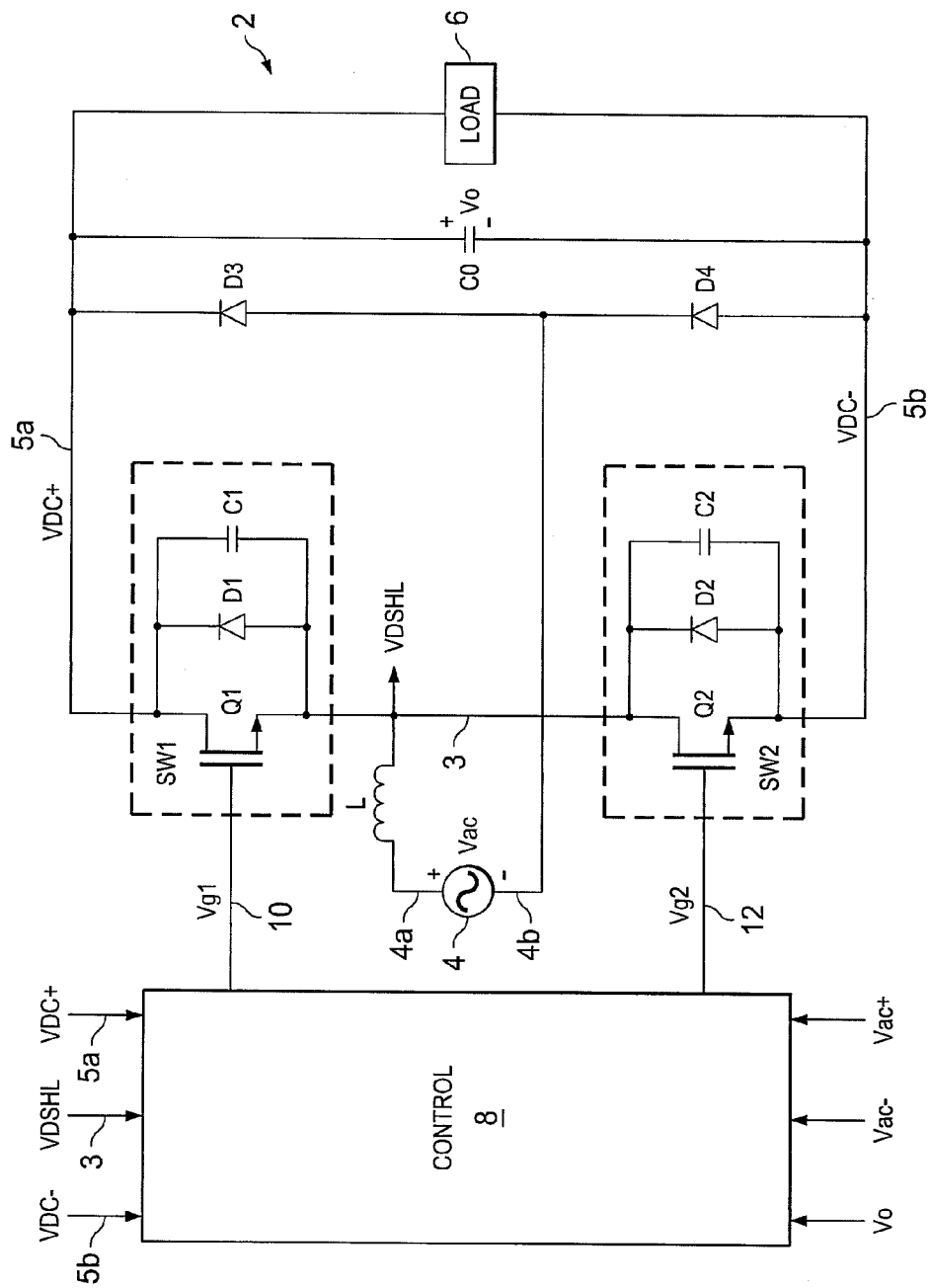
FIG. 1 is a schematic diagram illustrating a bridgeless totem pole power factor correction (PFC) converter with adaptive zero voltage switching control using adjustable freewheeling switch on-time control.

One or more embodiments or implementations are hereinafter described in conjunction with the drawings, wherein like reference numerals are used to refer to like elements.

Referring initially to FIGS. 1-6, FIG. 1 shows a bridgeless totem pole power factor correction (PFC) converter or conversion system 2 receiving single-phase AC input power from an AC source 4 and providing a DC output Vo to power a load 6. The system 2 includes a controller 8 implementing adaptive zero voltage switching control using selective freewheeling switch on-time adjustment in providing first and second switching control signals 10 and 12 to operate an upper first switch circuit SW1 including transistor Q1 with a body diode D1 and a drain-source capacitance C1, and a second switching circuit SW2 including transistor Q2, body diode D2 and capacitor C2. The transistors Q1 and Q2 are connected in a totem pole circuit with Q1 coupled between a positive DC output terminal or node 5a (VDC+) and a first internal node 3 (VDSHL), and with the second transistor Q2 coupled between the node 3 and a second (negative) DC output node 5b. An inductor L is coupled between a first AC input node 4a and the internal node 3, and a return circuit is provided including a first diode D3 with an anode coupled with a second AC input node 4b and a cathode coupled with the first DC output node 5a, along with a second diode D4 having an anode coupled with the lower DC output node 5b (VDC−) and a cathode coupled with the second AC input node 4b.

Figure 2:
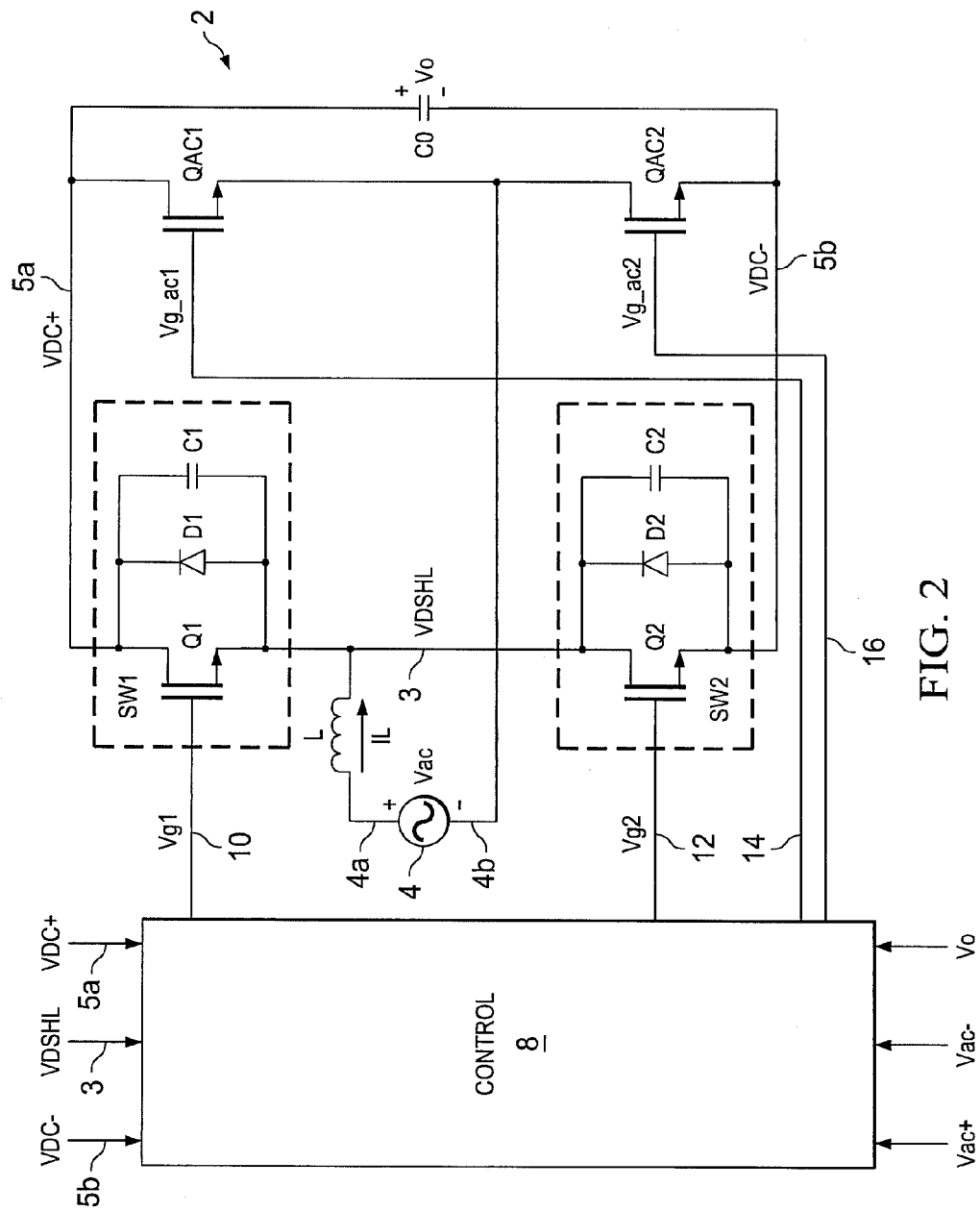
FIG. 2 is a schematic diagram illustrating another bridgeless totem pole PFC converter embodiment using MOSFET transistors for half cycle line rectification.

FIG. 2 illustrates another embodiment of the bridgeless totem pole PFC converter system 2 in which the return circuit includes transistors QAC1 and QAC2 replacing the diodes D3 and D4 of FIG. 1, respectively, where the return circuit transistor components QAC1 and QAC2 are operated according to switching control signals 14 and 16, respectively, from the controller 8 in the embodiment of FIG. 2. In this regard, the totem pole switches Q1 and Q2 are operated according to higher frequency switching control signals 10 and 12, with the return circuit transistors QAC1 and QAC2 in the embodiment of FIG. 2 operated by switching control signals 12 and 14 alternating every half cycle of the AC input power. Any suitable form of totem pole switches Q1 and Q2 can be used in various embodiments. In one non-limiting example, gallium nitride (GaN) N-channel MOSFET transistors are used, although other embodiments are possible using silicon-based MOSFET transistors for the totem pole switches Q1 and Q2. In addition, where provided, the return circuit switches QAC1 and QAC2 can be any suitable form of semiconductor switches, such as silicon-based N-channel MOSFETs as shown in FIG. 2. In this example, moreover, the controller 8 provides an active high gate control signal 10 (Vg1) to the gate of Q1 and a gate control signal 12 (Vg2) to the gate of Q2, and provides alternating gate control signals 14 and 16 (Vg_ac1 and Vg_ac2) to operate the switches QAC1 and QAC2 of the return circuit in FIG. 2.

As seen in FIGS. 1 and 2, the controller 8 receives various measurement or feedback signals including the voltage VDSHL at the intermediate node 3 joining the totem pole switches Q1 and Q2, along with positive and negative voltage signals VDC+ and VDC− representing the voltages at the nodes 5a and 5b, as well as one or more feedback signals indicating the AC voltage provided by the source 4 across the nodes or terminals 4a and 4b. In this manner, the controller 8 can regulate the DC output voltage Vo across an output capacitance CO at the output nodes 5a and 5b by the switching operation of Q1 and Q2, and can also ascertain the drain-source voltages across Q1 and Q2 for intelligent switching control to facilitate zero voltage switching as described further below. Moreover, the controller 8 uses the AC input voltage feedback to determine the input polarity for selective switching of any included return circuit transistors QAC1 and QAC2 (e.g., FIG. 2 and FIG. 14 below) and for designating a given one of the totem pole switches Q1 and Q2 as an active or main switch and the other as a freewheeling or synchronous switch in each AC input half cycle according to the input voltage polarity.

Referring also to FIGS. 3-6, the controller 8 designates the lower totem pole switch Q2 as the active switch and the upper totem pole switch Q1 as the freewheeling switch for positive AC input cycles (e.g., when the voltage across input nodes 4a and 4b is positive), and designates the upper switch Q1 as the active switch and the lower switch Q2 as the freewheeling switch for negative AC input polarities. FIGS. 3-6 illustrate different totem pole switching conditions and corresponding current flow paths for positive and negative AC input cycles for the case shown in FIG. 1 in which the return circuit includes diodes D3 and D4. It will be appreciated that similar switching conditions and flow paths will be found for embodiments using transistors in the return circuit (e.g., FIGS. 2 and 14).

Figure 3:
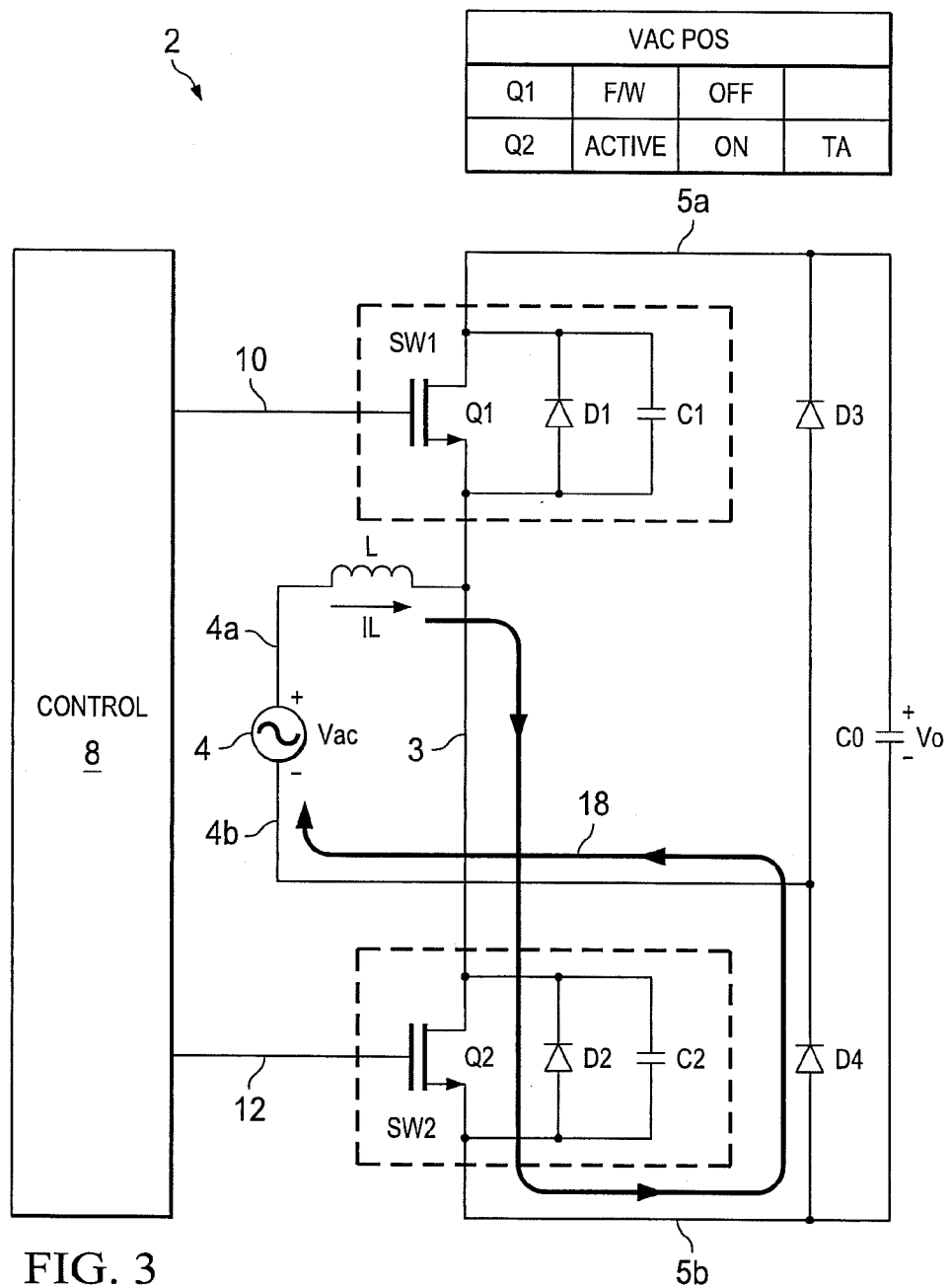
FIG. 3 is a schematic diagram illustrating current flow in the PFC converter of FIG. 1 operating with a positive AC input with the active lower switch on and the upper freewheeling switch off.
Figure 4:
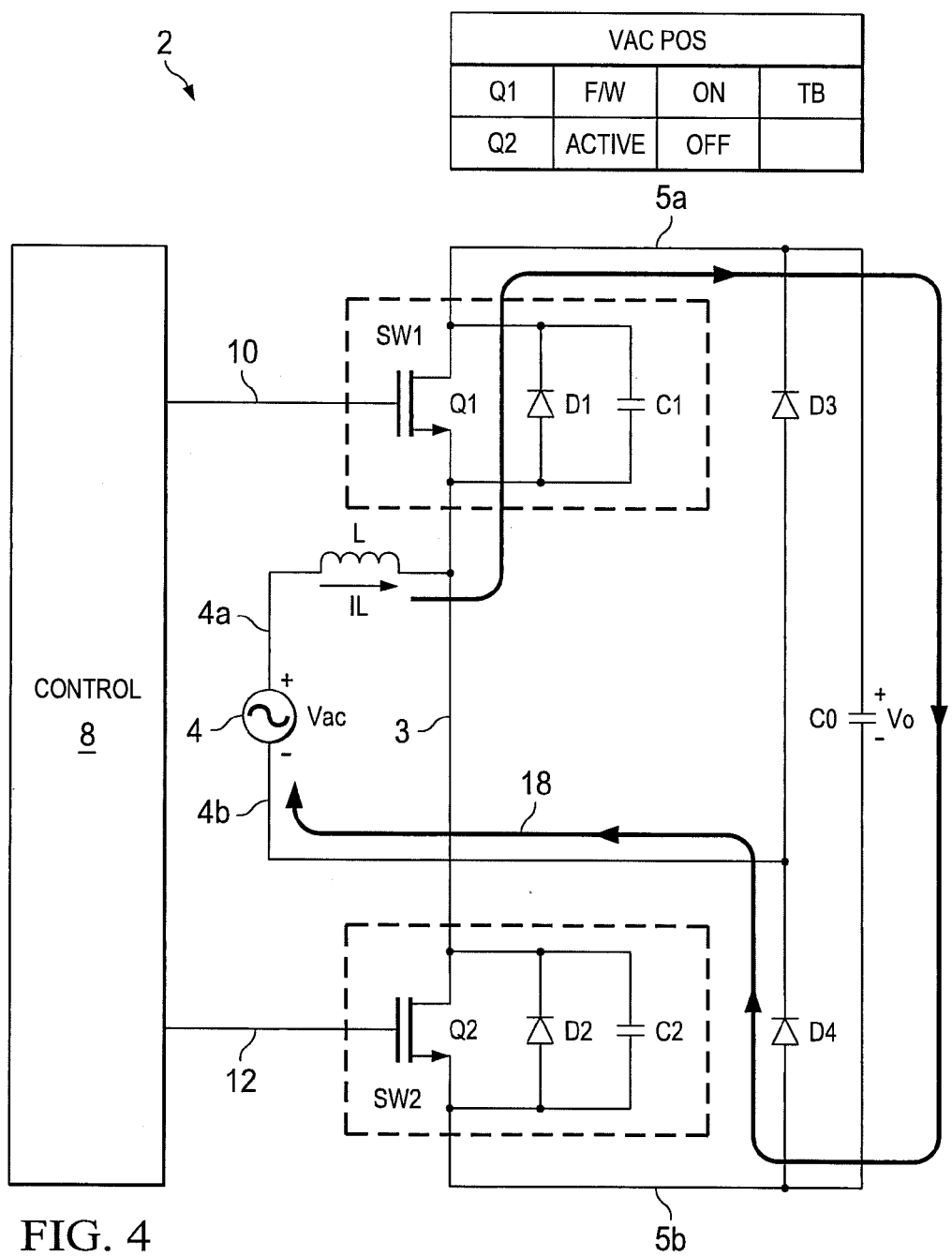

FIG. 3 shows an example current path 18 (shown in dotted line in the figure) with the totem pole switch Q1 off and Q2 on for a positive polarity half cycle of the AC input source 4, where Q2 is designated as the active switch and Q1 is the freewheeling switch. In this case, the inductor current IL flows through the inductor L from the first AC input node 4a to the first internal node 3 (e.g., left to right in the figure) and then through the actuated active transistor Q2 to the second DC output node 5b. The current continues to flow along the illustrated path 18 through the lower return circuit diode D4 and then to the second AC input node or terminal 4b. The operation with the active switch Q2 in the on or conductive state of FIG. 3 increases the current IL through the inductor L. This is followed by the switching state shown in FIG. 4, also for a positive AC input voltage. In FIG. 4, the freewheeling totem pole switch Q1 is turned on and the lower active switch Q2 is turned off, with the current in this case flowing from the inductor L to the internal node 3 and then through the freewheeling switch Q1 to the upper or first DC output node 5a. This current flow charges the output capacitor CO and returns from the lower or second DC output node 5b through the return circuit diode D4 to the negative AC input terminal 4b as shown in FIG. 4.

Figure 5:
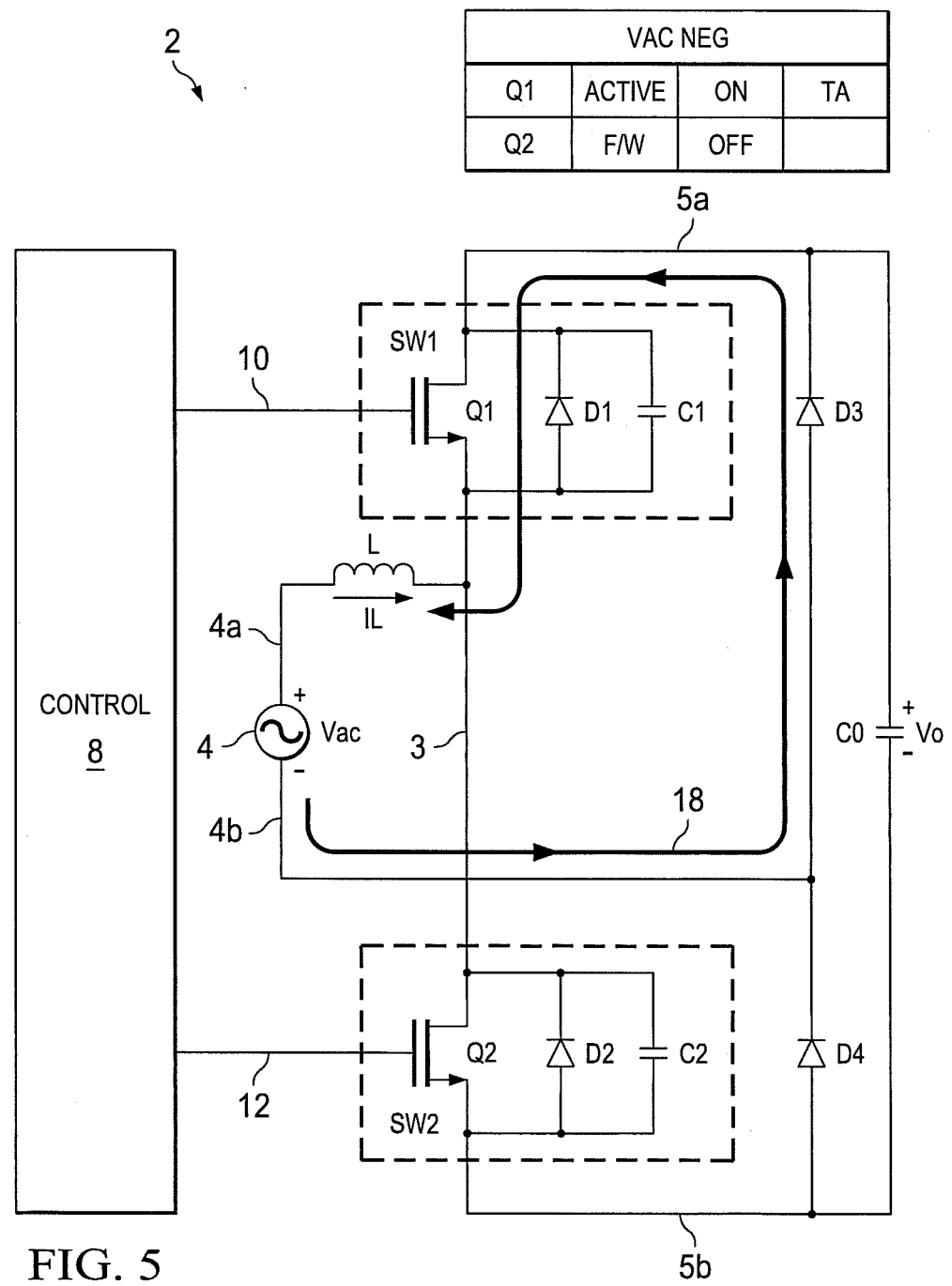
FIG. 5 is a schematic diagram illustrating current flow in the PFC converter of FIG. 1 operating with a negative AC input with the active upper switch on and the lower freewheeling switch off.
Figure 6:
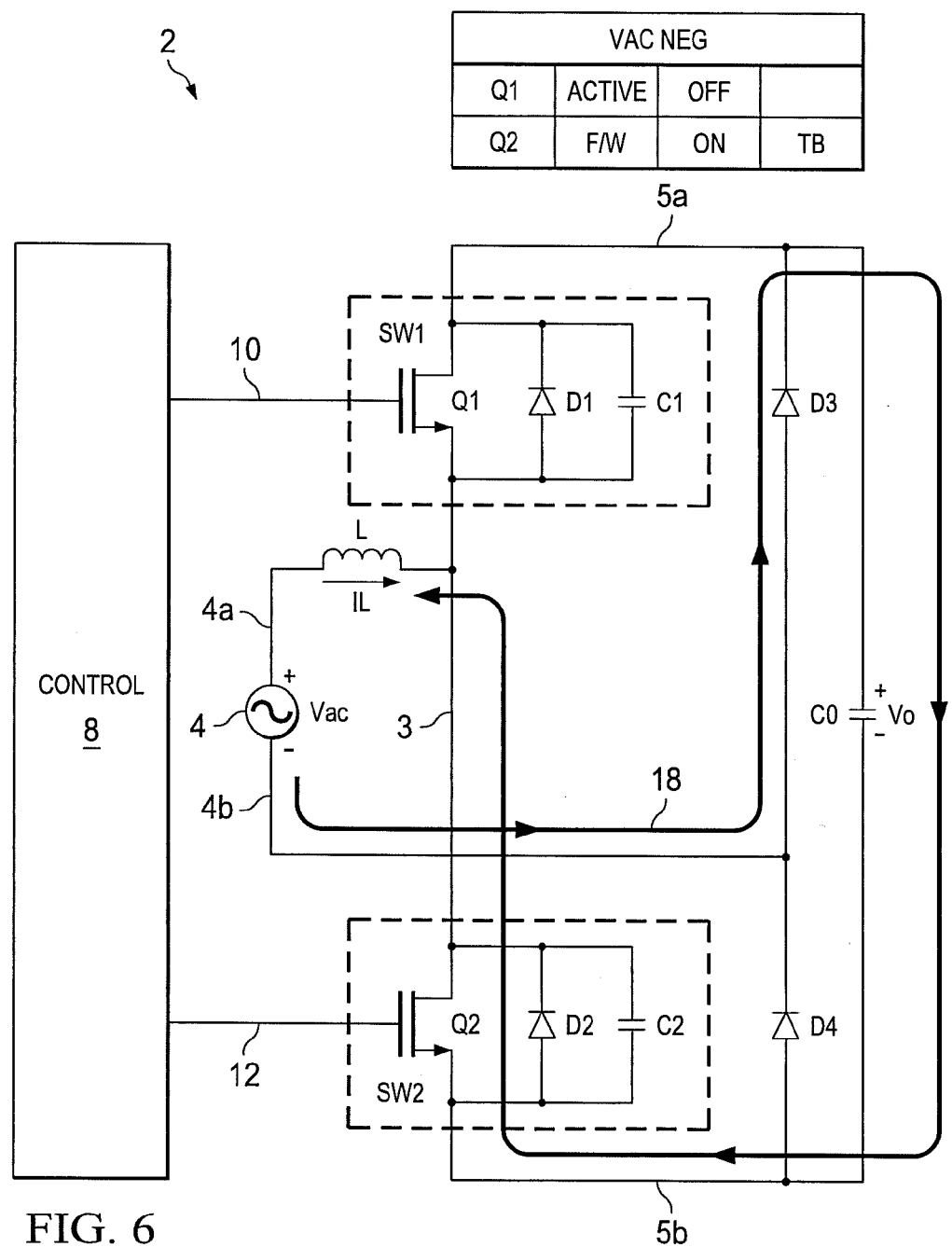

FIGS. 5 and 6 illustrate the PFC circuit operation for negative AC input half cycles, with Q1 designated as the active switch and Q2 designated at the freewheeling switch. Current flows in FIG. 5 with Q1 on and Q2 off along the path 18 from the second AC input node 4b through the upper return circuit diode D3, returning to the active switch Q1 and building up the reverse current IL through the inductor L from the first internal node 3 to the left to return to the first AC input node 4a. In FIG. 6, the upper active switch Q1 is turned off and the freewheeling switch Q2 is turned on, causing the current to flow from the AC input source 4 out of the second AC input node 4b through the diode D3 and the output capacitor CO, returning through the freewheeling transistor Q2 and the inductor L to the first AC input node 4a.

Figure 7:
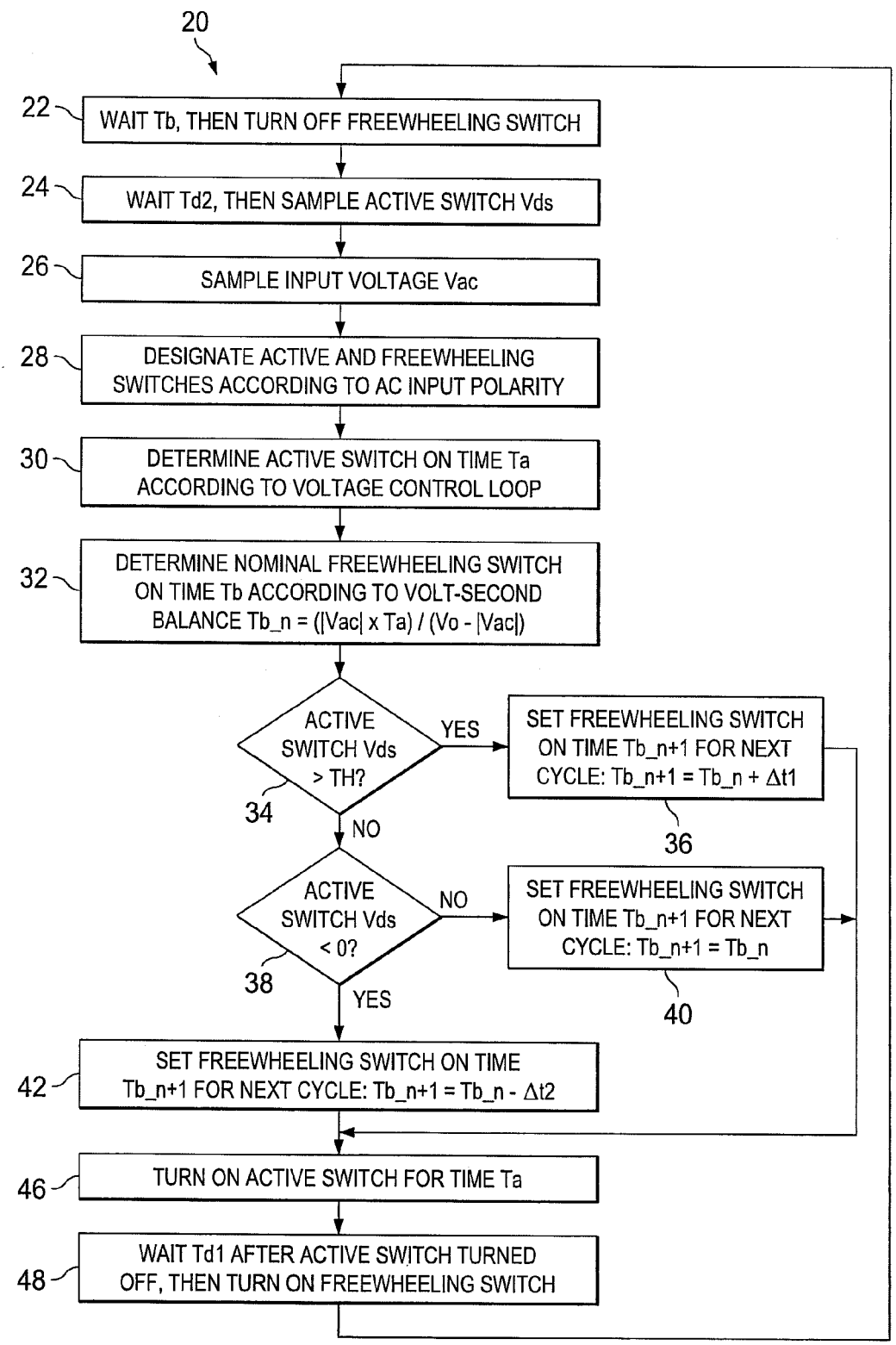
FIG. 7 is a flow diagram illustrating a process implemented in the bridgeless PFC converter controller of FIG. 1 for adaptive zero voltage switching.

Referring also to FIG. 7, the controller 8 in one embodiment implements transition mode (TM) operation at the boundary between continuous conduction mode (CCM) and discontinuous conduction mode (DCM), although not a strict requirement of all possible embodiments. A method or process 20 is illustrated in FIG. 7 for controlling a bridgeless totem pole power factor correction converter, such as the converters 2 of FIGS. 1-6 above, wherein the illustrated controller 8 can be implemented using any suitable logic circuitry, programmable or programmed processor elements, analog circuitry and/or combinations thereof to implement the illustrated process 20 in various embodiments. Moreover, the controller 8 can be a separate power converter control integrated circuit in certain embodiments (e.g., FIGS. 11, 12 and 15 below). In operation, the controller 8 detects positive and negative AC input half cycles based at least partially on the AC input voltage polarity at the nodes 4a and 4b, and designates one of the totem pole switch circuits SW1 or SW2 as an active switch for a given AC input half cycle and designates the other switch circuit as the freewheeling switch for that half cycle. In the illustrated embodiment, for example, the controller 8 designates SW1 (e.g., Q1) as the active switch and designates SW2 (e.g., Q2) as the freewheeling switch for negative AC input half cycles, and designates SW2 as the active switch and SW1 as the freewheeling switch for positive AC input half cycles.

The controller 8 operates in a sequence of switching cycles, during which the designated active switch is turned on and then off, followed by the freewheeling switch being turned on and then off. In certain embodiments, the controller 8 provides the first and second switching control signals 10 and 12 to implement these pulses, and may provide dead time control such that both switches Q1 and Q2 are not turned on at the same time, with certain predefined or adjustable dead times defining non-zero delays between turning one switch off and turning the other switch on in order to avoid short-circuiting the DC output bus. In the illustrated embodiment, moreover, the controller 8 employs constant on-time (COT) switching of the designated active switch for a time Ta determined according to close loop output voltage feedback control, with the designated freewheeling switch being turned on for a freewheeling switch on-time Tb in each switching cycle according to the determination of a Volt×Second relationship. Other embodiments are possible in which other pulse width modulation switching techniques are employed by the controller 8 in alternately switching the designated active switch and the designated freewheeling switch, including without limitation duty cycle control, etc.

The method 20 in FIG. 7 illustrates one example switching cycle, with the illustrated process flow being repeated in subsequent switching cycles. Beginning with the freewheeling switch on, the controller 8 waits for the computed freewheeling switch on-time (Tb) to expire and turns the freewheeling switch off at 22. The controller 8 then waits a predetermined (or otherwise computed) second dead time Td2 following turn off of the designated freewheeling switch, and then samples or otherwise senses the voltage Vds across the designated active switch for the given switching cycle at 24, described herein as the current cycle "n". As seen in FIG. 1, moreover, the controller 8 receives input signals the DC+, VDSHL and VDC−, and thus samples the drain-source voltage across Q1 (VDC+−VDSHL), as well as the drain-source voltage of Q2 (VDSHL−VDC−). The controller 8 also samples the input voltage Vac at 26, and designates the active and freewheeling switches according to the AC input polarity at 28.

At 30 in FIG. 7, the controller 8 determines the active switch on-time Ta at least partially according to an output voltage control loop. Other embodiments are possible in which any suitable control technique is used by the controller 8 to determine or otherwise compute the active switch on-time Ta, including without limitation current control loops, open loop operation, etc. The active switch on-time determined at 30 is then used in the current switching cycle (e.g., at 46 described below) for operating the designated active switch in the current switching cycle n.

At 32 in FIG. 7, the controller 8 computes a nominal freewheeling switch on-time Tb_n for the current switching cycle n based at least partially on a Volt×Second balancing relationship using the active switch on-time Ta for the given switching cycle n. In one embodiment, the controller 8 computes the nominal freewheeling switch on-time Tb_n at 32 for the given switching cycle n as a product of an absolute value of the voltage at the first and second AC input nodes 4a, 4b (|Vac|) and the active switch on-time Ta in the given switching cycle divided by the difference between the absolute output voltage value |Vac| and the converter output voltage Vo, according to the following equation (1):

$$Tb\_n = (|Vac| \times Ta)/(Vo - |Vac|). \quad (1)$$

At 34-42 in FIG. 7, the controller 8 selectively offsets or adjusts the nominal freewheeling switch on-time Tb_n for the given switching cycle n based at least partially on the sampled active switch voltage. In the illustrated embodiment, the controller 8 uses the drain-source voltage Vds across the designated active switch, sampled at 24 to implement selective offsetting or adjustment to provide a computed freewheeling switch on-time Tb_n+1 for the following switching cycle "n+1". A determination is made at 34 in FIG. 7 by the controller 8 as to whether the sampled active switch voltage Vds exceeds a positive threshold TH. If so (YES at 34), the controller 8 offsets the nominal freewheeling switch on-time Tb_n for the current switching cycle n by adding a first predetermined offset time Δt1 to the nominal freewheeling switch on-time Tb_n determined at 32 in order to provide a computed freewheeling switch on-time Tb_n+1 for the next switching cycle n+1.

The controller 8 then turns on the designated active switch for the determined time Ta at 46 and provides the freewheeling switching control signal to actuate the designated freewheeling switch for the computed freewheeling switch on-time Tb_n+1 for the next switching cycle n+1 at 48 and 22 in FIG. 7. The process 20 is then repeated by the controller 8 in a series of consecutive switching cycles. As discussed above, moreover, the controller 8 can selectively insert dead times between the active in freewheeling switch on-times, for example, a first dead time Td1 between the designated active switch being turned off and the designated freewheeling switch being turned on, and a second dead time Td2 between the freewheeling switch being turned off and the active switch being turned on.

If the drain-source voltage of the active switch does not exceed the positive threshold TH (NO at 34 in FIG. 7), the controller determines at 38 whether the active switch voltage Vds is negative (i.e., Vds<0). If not (NO at 38), the ideal zero voltage switching condition has been reached or approximated, since the voltage of the designated active switch is between 0 and the threshold value TH. Accordingly, the controller 8 sets the freewheeling switch on-time Tb_n+1 at 40 to the nominal value computed at 32, and this value is thereafter used at 48 and 22 for operating the freewheeling switch in the next switching cycle "n+1". If instead the active switch Vds is negative (YES at 38), the controller selectively offsets the freewheeling switch on-time in the other direction at 42 by subtracting a second predetermined offset time Δt2 from the nominal freewheeling switch on-time Tb_n to provide the computed freewheeling switch on-time Tb_n+1 for the next switching cycle n+1.

In certain implementations, the first and second offset times Δt1 and Δt2 may be the same, but these may be different in other embodiments. Furthermore, the controller 8 in certain embodiments may selectively modify one or both of the offset times Δt1 and Δt2, for example, if a condition is reached under which the control operations shown in FIG. 7 results in a certain threshold number of consecutive switching cycles always requiring offsetting in the same direction, in which case the controller 8 may selectively increase the corresponding offset time Δt1 or Δt2. In other possible embodiments, moreover, the threshold value TH can be modified are adapted based on user input to an integrated circuit controller 8 and/or based on one or more control conditions, such as a certain threshold number of consecutive switching cycles always requiring offsetting in the same direction, in which case the threshold value TH may be selectively reduced.

The inventor has appreciated that the selective offsetting of the computed nominal freewheeling switch on-time, as shown for example at 34-42 in FIG. 7, advantageously provides a closed loop mechanism for controlling the active switch voltage, and thus mitigating or minimizing both switching loss and conduction loss of the active switch. In this regard, the selective extension of the freewheeling switch on-time at 36 (e.g., when the sampled active switch voltage Vds is positive) addresses situations where the corresponding drain-source capacitance of the designated active switch is not fully discharged by negative current flow at the time the switch is turned on. Accordingly, this aspect of the process 20 mitigates or avoids switching loss of the active switch. Conversely, if the active switch were turned on after the corresponding inductor current IL reverses too much, the switch will suffer from conduction loss due to reverse biasing of the active switch body diode. In this regard, selective subtraction from the computed nominal freewheeling switch on-time at 42 drives the switching operation to more quickly actuate the active switch before the current reversal becomes significant, thereby mitigating such conduction loss. In operation, therefore, the selective freewheeling switch on-time concept regulates the switching by driving operation toward the ideal zero voltage, zero current switching condition for the active switch. In this regard, moreover, the designation of the active switch and the freewheeling switch will change depending on the voltage polarity of the AC input, and thus the control technique of FIG. 7 effectively controls zero voltage switching and mitigates conduction and switching loss for both switches Q1 and Q2 of the totem pole circuitry. In this manner, efficient operation of the bridgeless totem pole PFC converter 2 is facilitated without adding system cost or complexity.

The presently disclosed techniques therefore provide a reliable control scheme to achieve zero voltage or near-zero voltage switching. Certain embodiments also advantageously employ Volt×Second balancing to set the freewheeling switch nominal on-time value, which is adaptively changed based on the sensed Vds to regulate the system operation toward zero voltage switching. As a result, high power factor operation of the PFC system 2 can be facilitated by the application of the intelligent adaptive switching control aspects of the present disclosure. In addition, the disclosed techniques do not require complicated high-speed current sensing circuitry in order to achieve zero or near-zero current switching of the active switch. Moreover, as seen below in connection with FIG. 14, the control concept is applicable with respect to both single phase and interleaved (e.g., multiphase) PFC architectures, in which freewheeling switch negative current is controlled and mitigated by sensing PFC active switch Vds at or near the turn on point and the freewheeling switch turn-on time Tb_n+1 is adjusted in the next switching cycle. In addition, the implementation detailed blow in connection with FIGS. 14 and 15 operates with sensing of the active switch voltage for only a single phase in order to implement the freewheeling switch on-time adjustment for multi-phase totem pole PFC systems. Furthermore, the disclosed techniques and control apparatus operate independent of power circuit parameter variations, as the approach involves a regulated configuration adapting to system changes. Moreover, while illustrated and described above in connection with transition mode operation, the concepts of the present disclosure may be applied in connection with continuous conduction mode (CCM) and/or discontinuous conduction mode (DCM) or other forms of pulse width modulated switching operation. In addition, the concepts of the present disclosure are not limited to use with constant on-time (COT) switching, and can be applied in connection with other forms of pulse width modulated control of a single or multi-phase bridgeless totem pole PFC converter 2.

Figure 8:
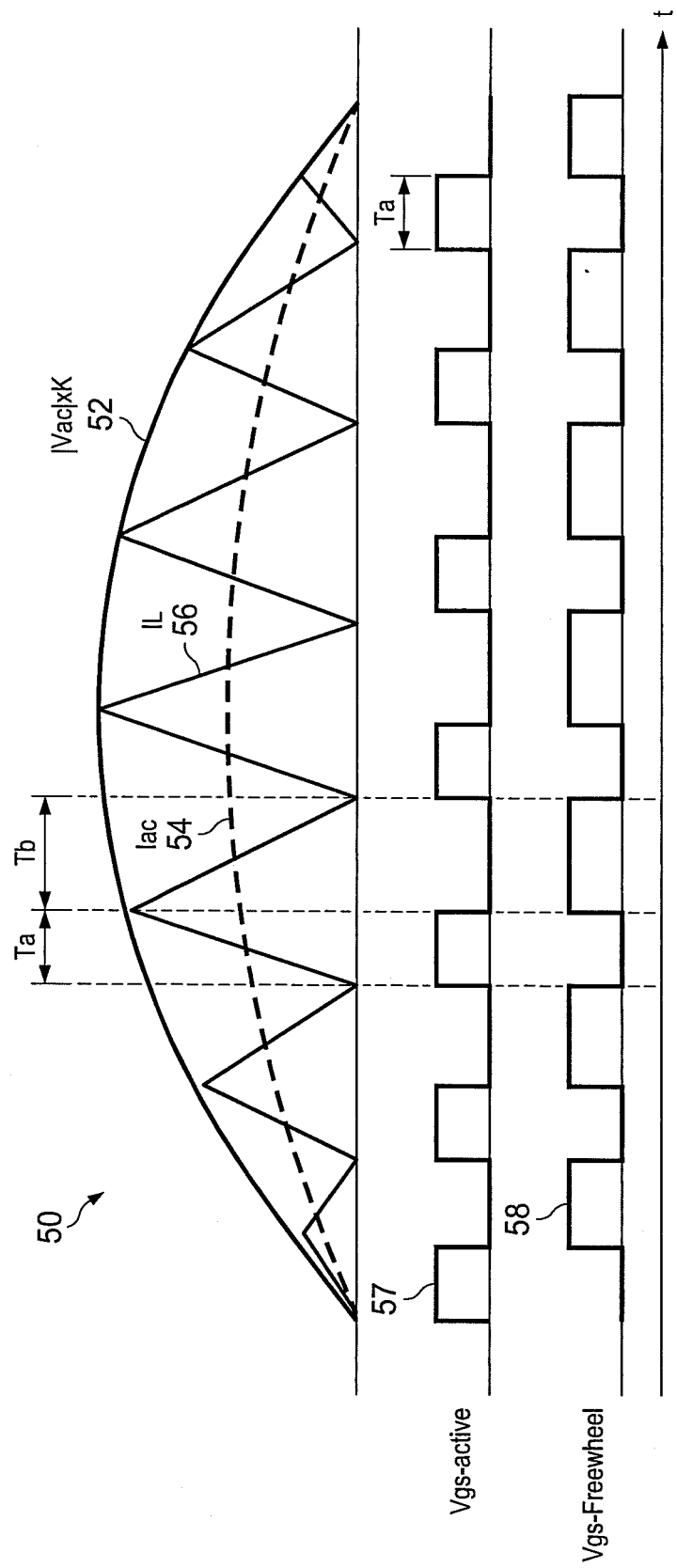
FIG. 8 is a waveform diagram illustrating transition mode operation with constant active switch on-time control of the PFC converter of FIG. 1 for a positive AC input half cycle.
Figure 9:
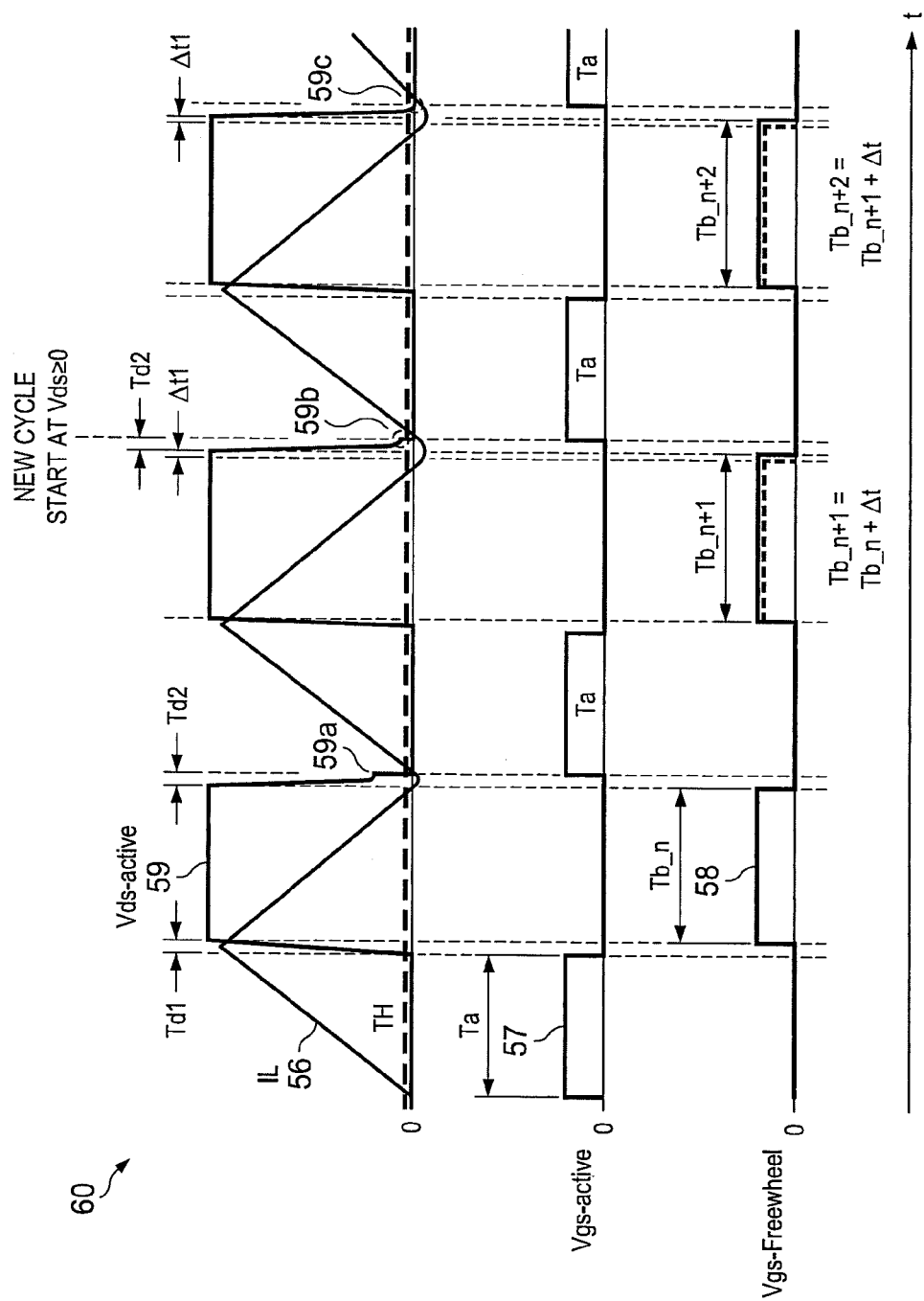
FIG. 9 is a waveform diagram illustrating adaptive zero voltage switching control in the PFC converter of FIG. 1 to adjust from insufficient negative freewheel current toward zero voltage switching of the active switch.
Figure 10:
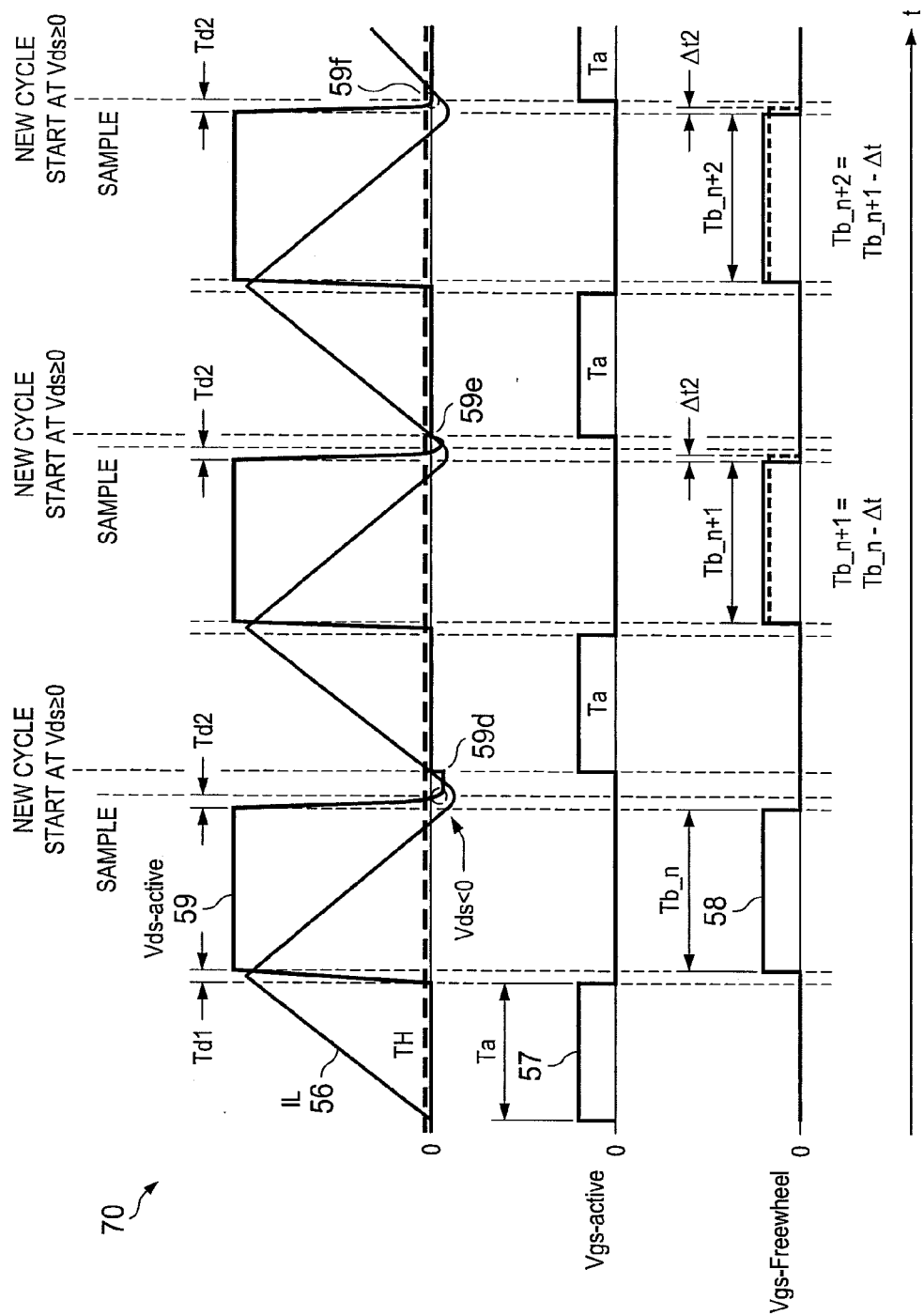
FIG. 10 is a waveform diagram illustrating adaptive zero voltage switching control in the PFC converter of FIG. 1 to adjust from excessive negative freewheel current toward zero voltage switching.

Referring also to FIGS. 8-10, FIG. 8 provides a waveform diagram 50 illustrating transition mode operation of the PFC converter 2 with constant active switch on-time control for a positive AC input half cycle. In this example, the absolute AC input voltage waveform 52 (|Vac|*K) is generally sinusoidal through the illustrated positive half cycle as is the corresponding AC input current 54, with the inductor current IL shown as curve 56. FIG. 8 further illustrates selective actuation of the active switch (e.g., Q2 in FIG. 1 is active for positive AC input half cycles), with the gate-source switching signal curve 57 representing the gate-source voltage Vgs of the active switch Q2 for a constant on-time of Ta, as well as selective actuation of the freewheeling switch (Q1 in this example) via gate-source voltage waveform 58. As seen in FIG. 8, moreover, the freewheeling switch on-time Tb changes over the course of the AC input positive half cycle, generally in proportion to the absolute value of the AC input voltage 52 based on the Volt×Second relationship in the above equation (1), whereas the active switch on-time Ta is generally constant in this example.

FIG. 9 provides a more detailed waveform diagram 60 illustrating three example switching cycles "n", "n+1" and "n+2", including the active switch drain-source voltage curve 59. As seen in FIG. 9, the adaptive zero voltage switching control in the PFC converter 2 of FIG. 1 adjusts operation from insufficient negative freewheeling current in the illustrated first cycle "n" causing adjustment in the second illustrated cycle "n+1", leading to a regulated zero or near-zero voltage switching situation in the third cycle "n+2". As seen in FIG. 9, moreover, the freewheeling pulses 58 are started a first dead time delay time Td1 after the end of the active switch pulses 57, and the active switch pulses 57 are started to begin new switching cycles (e.g., at 46 in FIG. 7 above) a second dead time delay Td2 after the freewheeling switch is turned off under control of the converter controller 8. In this example, the inductor current IL 56 transitions below zero (i.e., negative) in the first cycle, and without any adjustment in the freewheeling switch on-time Tb_n, the subsequent active switch pulse 57 is started while the active switch has a positive drain-source voltage at 59a which is above the illustrated non-zero positive threshold level TH.

In this case, there is insufficient negative current to be able to fully discharge the main drain-source capacitance of the active switch for the desired zero voltage switching operation. Accordingly, the controller 8 samples the active switch voltage (e.g., at 24 in FIG. 7) following the freewheeling switch being turned off, and determines that the active switch drain-source voltage (at 59a in FIG. 9) exceeds the threshold TH (YES at 34 in FIG. 7). Accordingly, the controller 8 adds the offset value Δt1 to the nominal freewheeling switch on-time to provide the freewheeling switch on-time for the next cycle "n+1" (Tb_n+1=Tb_n+Δt1 at 36 in FIG. 7). As seen in FIG. 9, this results in an extension of the freewheeling switch in-time in the next cycle, resulting in a reduction in the sampled active switch drain-source voltage in the next sample at 59b. In this example, the switch voltage at 59b still slightly exceeds the threshold TH as shown in FIG. 9, and the controller 8 accordingly adds the offset value Δt1 to the subsequent computed nominal freewheeling switch on-time to provide the freewheeling switch on-time for the next cycle "n+2", which further reduces the active switch voltage at 59c in FIG. 9 to be approximately 0, which is the desired operating condition. Thus, the operation of selective additive offsetting or adjustment for measured active switch voltages exceeding the threshold advantageously drives the control toward the desired zero voltage switching condition as shown in FIG. 9.

FIG. 10 illustrates adaptive zero voltage switching control in the PFC converter 2 to adjust from excessive negative freewheel current toward zero voltage switching operation. The inventor has appreciated that too much negative current will increase conduction loss if the active switch is turned on while a negative voltage is seen across the drain-source connections. To combat this, the process 20 of FIG. 7 samples the active switch drain-source voltage and determines this to be negative in the first illustrated cycle "n" of FIG. 10. As seen at 59d in FIG. 10, moreover, this situation results in the active switch being turned on while the voltage is negative due to negative current preceding the switching sufficient to provide a reverse charge across the drain-source capacitance of the designated active switch. The controller 8 detects this condition (NO at 34 and YES at 38 in FIG. 7), and accordingly reduces the nominal freewheeling switch on-time determined at 32 by Δt2 in order to provide the computed freewheeling switch on-time for the subsequent cycle "n+1" as Tb_n+1=Tb_n−Δt2 at 42 in FIG. 7.

As seen at 59e in FIG. 10, this causes the sampled drain-source voltage of the active switch to be closer to zero in the subsequent cycle "n+1". For this cycle, the controller 8 again determines that the active switch drain-source voltage is negative, and accordingly reduces the nominal freewheeling switch on-time by subtracting Δt2 for the next cycle "n+2", thereby driving the active switch drain-source voltage to approximately zero as seen at 59f in FIG. 10. Moreover, the illustrated embodiment of the controller 8 advantageously delays turning the active switch on until the active switch drain-source voltage is greater than or equal to zero (e.g., at 44 in FIG. 7), as illustrated by the positive or zero switch Vds voltage starting of the new cycles indicated in FIG. 10 for switching cycles "n+1" and "n+2". This operation provides the additional benefit of facilitating zero current switching in addition to zero voltage switching, which in turn facilitates reduction of electromagnetic interference (EMI) and minimizes active FET's conduction loss. Thus, the control method 20 of FIG. 7 and operation of the controller 8 advantageously regulate the switching operation so as to move operation from either direction toward the optimal zero voltage switching condition. In this manner, both conduction losses and switching losses are mitigated in a dynamic manner independent of system component parameters and other operating conditions, thereby facilitating high efficiency operation, with the Volt×Second nominal freewheeling switch on-time determination (32 in FIG. 7) facilitating unity power factor operation of the system 2.

Figure 11:
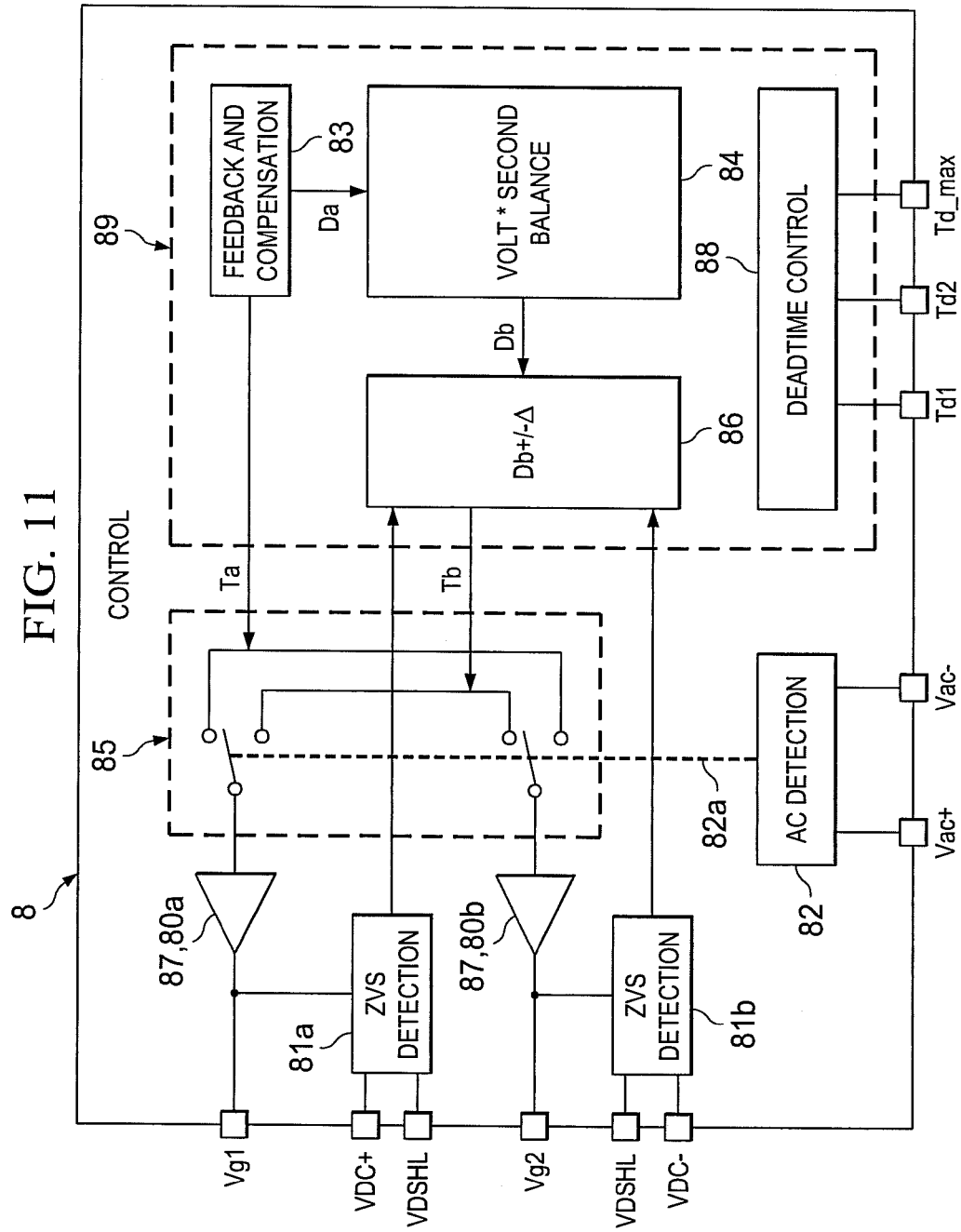
FIG. 11 is a simplified schematic diagram illustrating a converter control integrated circuit embodiment for operating the bridgeless PFC converter of FIG. 1.
Figure 12:
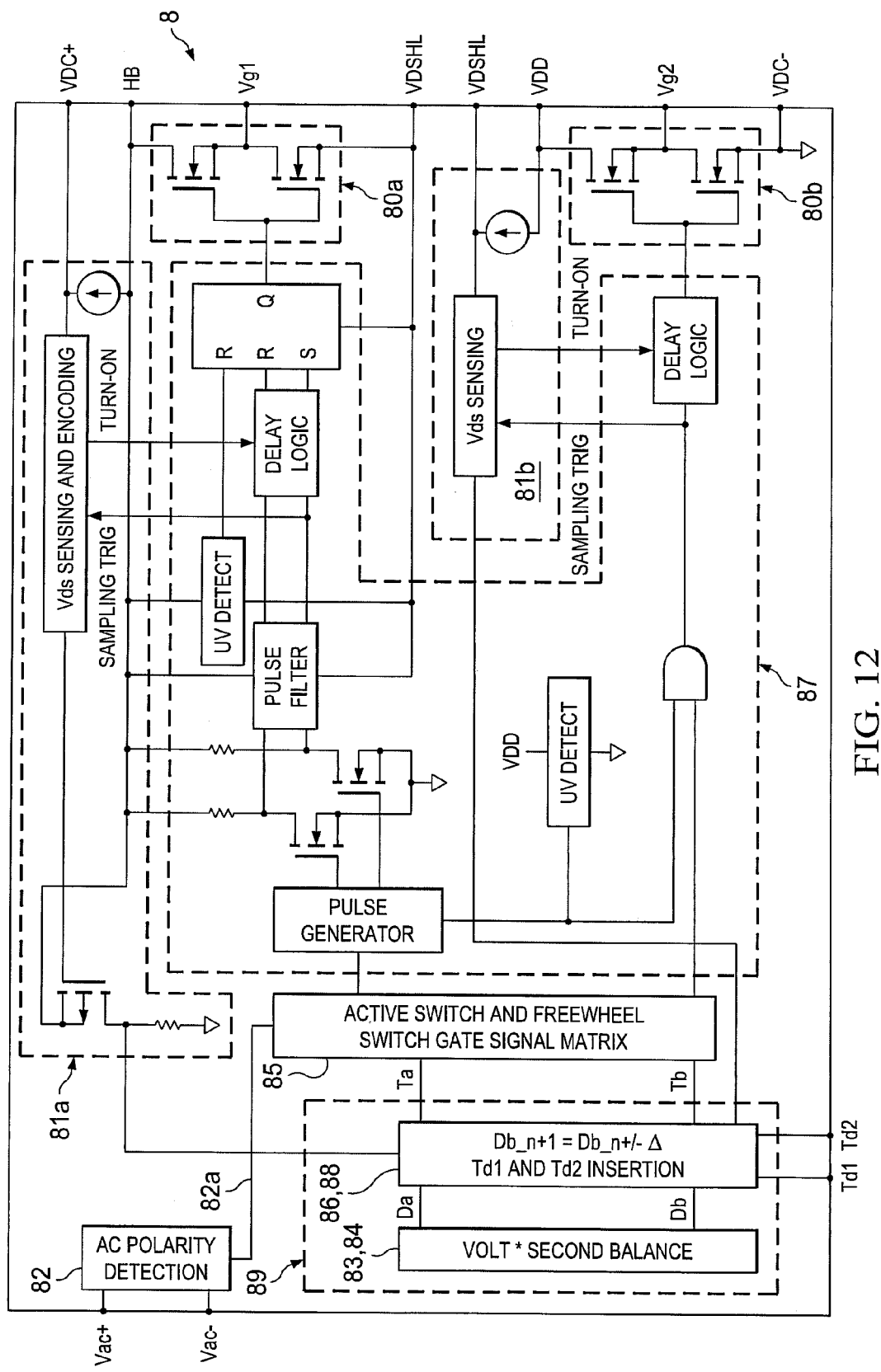
FIG. 12 is a detailed schematic diagram illustrating further details of the converter control integrated circuit embodiment of FIG. 11.

Referring now to FIGS. 11 and 12, integrated circuit embodiments of the controller 8 are illustrated for operating the bridgeless PFC converter of FIG. 1, including driver circuitry 80a and 80b for providing the gate control voltages Vg1 and Vg2 (first and second switching control signals 10 and 12 of FIG. 1) to operate the totem pole switches Q1 and Q2, respectively. The controller 8 further includes zero voltage switching (ZVS) detection circuitry 81a for sensing or sampling the drain-source voltage across Q1 (e.g., between VDC+ and VDSHL in FIG. 1) and ZVS detection circuitry 81b for sampling the voltage across Q2 (e.g., between VDSHL and VDC−). An AC detection circuit 82 provides a polarity detection signal 82a to a selection circuit 85 using the AC input voltage (Vac+, Vac−) inputs for AC positive and negative cycle detection and active/main and freewheeling switch determination. The Vds of the designated or determined active switch active is detected in each switching cycle by the ZVS circuitry 81, and the result (Vsd>, = or <0) is used to selectively modify the predicted freewheeling switch turn-on time Tb for the next cycle, with the active switch turn-on time determined according to a voltage control loop and the nominal freewheeling switch on-time determined using Volt×Second balancing as described above. In addition, the integrated circuit controller 8 includes dead time control circuitry 88, which may provide inputs for external control of the dead times Td1 and/or Td2, as well as a maximum dead time Td max in certain embodiments. The controller 8 further includes a control circuit 89 with a feedback and compensation circuit 83 providing the nominal active switch on-time delay Da to a Volt×Second circuit 84, and additionally provides the on-time Ta as a switchable input to the selection circuit 85 for provision to a driver circuit 80 corresponding to the designated active switch. In addition, the control circuit 89 includes an offsetting or adjustment circuit 86 receiving a nominal freewheeling switch on-time delay Db from the Volt×Second balancing circuit 84, and selectively providing the nominal or adjusted computed freewheeling switch on-time Tb as an input to the selection circuit 85 for provision to the driver circuit 80 corresponding to the designated freewheeling switch.

FIG. 12 illustrates further details of one possible embodiment, in which the control circuit 89 includes feedback and compensation as well as balancing circuitry 83, 84, and the offsetting and dead time circuitry 86, 88 providing the active and freewheeling switch on-times Ta and Tb to a gate signal matrix selection circuit 85. The matrix circuit 85 provides inputs to a pulse circuit 87 operative to provide an active switching pulse signal to the driver circuit 80 to actuate the designated active switch for the active switch on-time Ta for the current cycle and to provide a freewheeling switching pulse signal to the driver circuit 80 to actuate the corresponding designated freewheeling switch for the computed freewheeling switch on-time Tb_n+1 for the next switching cycle in order to facilitate zero voltage switching of the designated active switch as described above.

Figure 13:
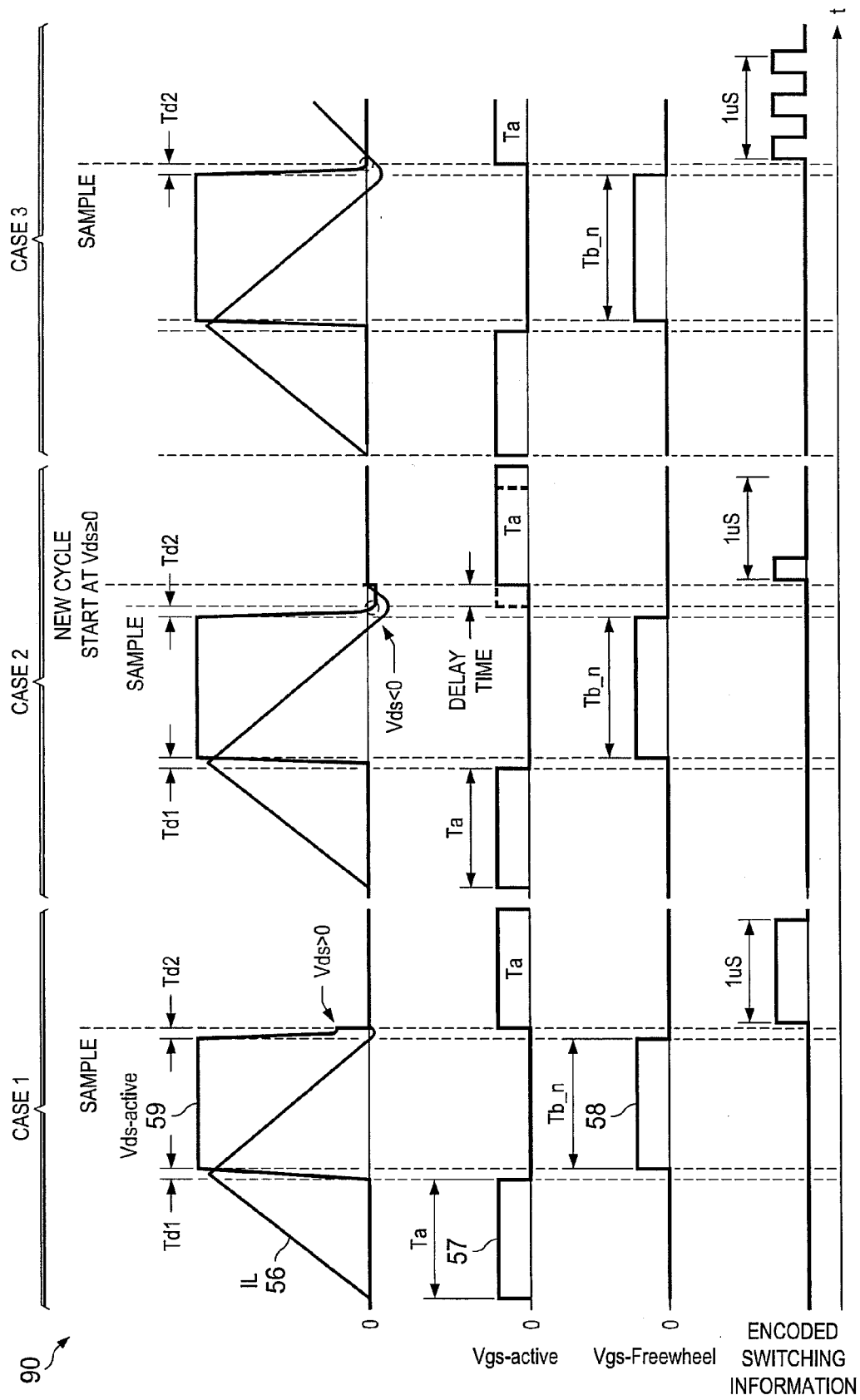
FIG. 13 is a waveform diagram illustrating delay time adjustment for different freewheel switch turn on cases in the adaptive zero voltage switching control of the converter of FIG. 1.

Referring also to FIG. 13, a waveform diagram 90 illustrates further operation of the controller 8 in the totem pole PFC converter 2 for three different cases Case 1, Case 2 and Case 3. For the case in which the upper switch Q1 is the designated active switch (e.g., negative polarity AC half cycle conditions in the illustrated example), the corresponding driver circuit 80a and the corresponding zero voltage switching detection circuit 81a provide the turn-on case information including the active switch voltage Vds to the main control circuit 89. Case 1 in FIG. 13 illustrates the active switch turning on at a positive voltage at Vds, in which case the driver circuit 81a sends a single 1 us pulse to the control circuit 89 (Encoded Switching information illustrated in FIG. 13). The pulse rising edge is synchronized with gate turn-on edge, so the control circuit 89 recognizes that the upper switch Q1 turns on without additional delay insertion, and this edge is used to initiate a new switching cycle in the illustrated embodiment. When a negative voltage is detected in Case 2 at the rising edge of a Q1 turn-on command, the driver circuit 80a holds the gate output low until Vds≥0 is detected. The gate output pulse is then offset by the dead time delay Td2 and compared with the gate command. In the same way, one single pulse is generated at the gate output turn-on edge, for example 250 ns. When the desired or optimal turning on condition is reached as shown in Case 3, the switching is turned on with Vds=0, with the upper driver circuit 80a providing the control circuit 89 with three 250 ns pulses in a 1 us period as shown in FIG. 13. Based on the top driver switching case information, the control circuit 89 in this embodiment adds a preset time (e.g., 10 ns) to or reduces the preset time from the freewheeling turn-on time for Case 1 or Case 2, respectively, and no freewheeling switch turn-on time adjustment is needed for Case 3.

Figure 14:
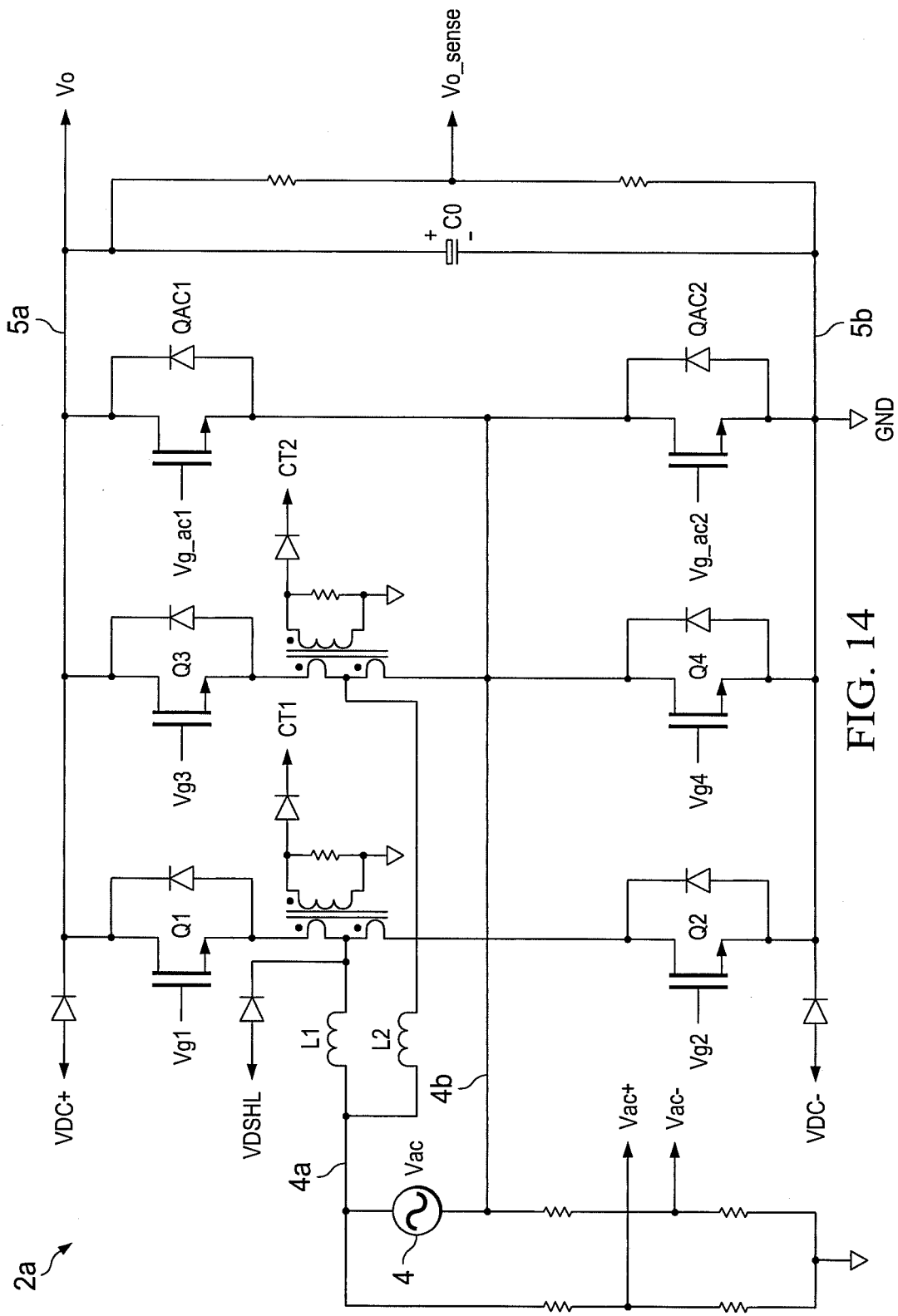
FIG. 14 is a schematic diagram illustrating an interleaved bridgeless totem pole zero voltage switching PFC controller embodiment.
Figure 15:
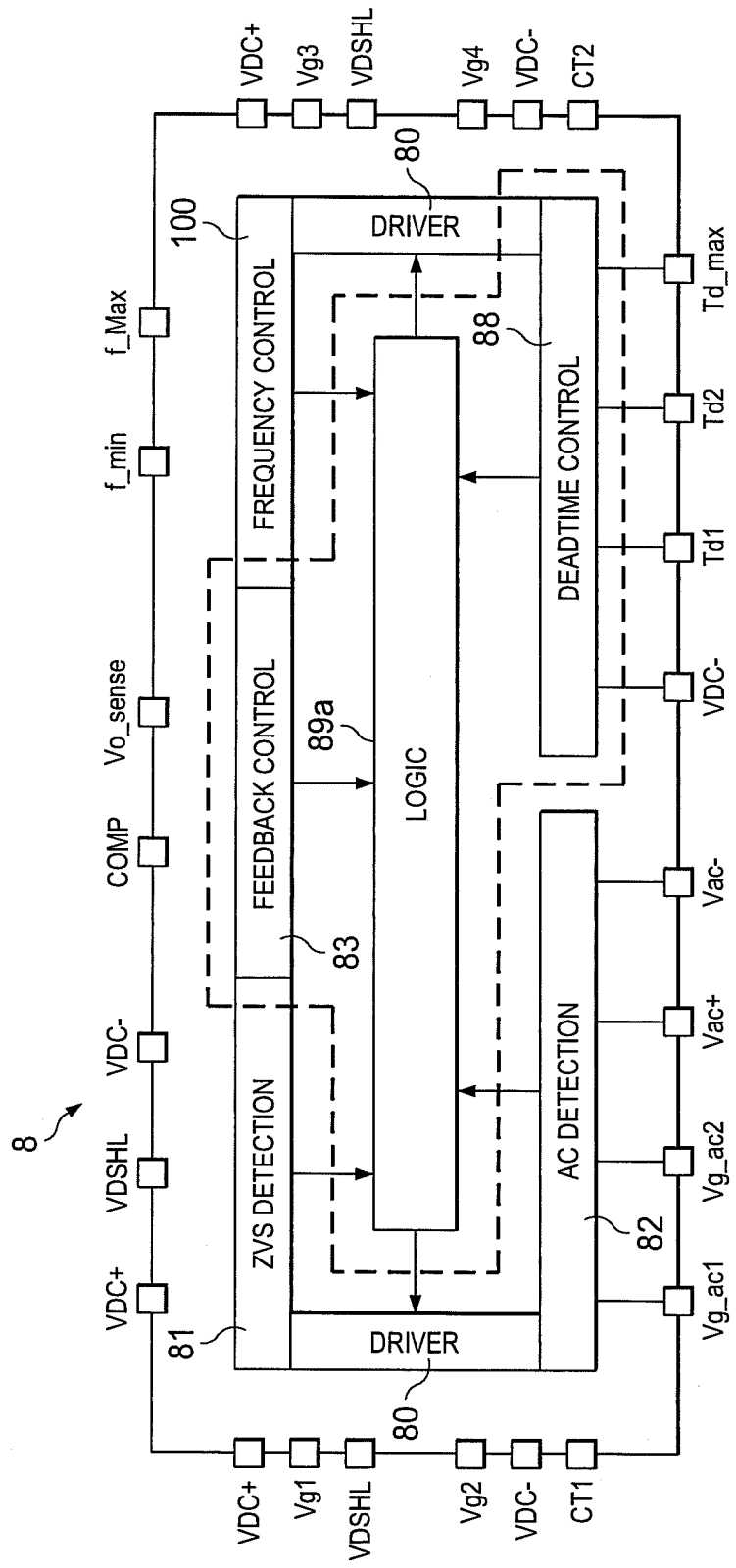
FIG. 15 is a simplified schematic diagram illustrating another converter control integrated circuit embodiment for operating the interleaved PFC converter of FIG. 14.

Referring also to FIGS. 14 and 15, the concepts of the present disclosure may be employed in control of interleaved bridgeless totem pole zero voltage switching PFC controller embodiments. FIG. 14 illustrates a 2-phase system 2a having two totem pole circuits including the above-described circuit including Q1 and Q2, as well as a second totem pole circuit including totem pole switches Q3 and Q4 also connected between the VDC+ and the VDC− nodes 5a and 5b. In addition, this embodiment employs MOSFET return circuit transistors QAC1 and QAC2 as described above in connection with FIG. 2, although diodes may instead be used in other embodiments, e.g., as seen in FIG. 1 above. Interleaved multi-phase totem pole PFC circuitry such as the system 2a in FIG. 14 is particularly advantageous for high-power applications (e.g., 300 Watts or more). As with the above-described single-phase embodiments, the multi-phase system 2a is operated via a controller 8 (e.g., FIG. 15) having corresponding driver output signals to provide gate control signals Vg1-Vg4 to the totem pole circuit switches Q1-Q4, as well as compensation and output voltage sensing inputs (Comp and Vo_sense inputs and FIG. 15) for determining the active switch on-time Ta for voltage regulation or other close loop control of the PFC converter 2a. Logic circuit 89a offsets gate signals Q1,2 and Q3,4 by 180 degrees based on detected switching period in previous switching cycle. Multi-phases interleaved control can be implemented by using the same control scheme. In addition, the example of FIG. 15 includes a frequency control circuit 100 receiving minimum and maximum frequency control inputs (e.g., f_min and f_max), as well as logic circuitry 89a implementing various functions as described above for controlling the driver circuits 80.

In this embodiment, moreover, the active switch voltages of only a single phase (e.g., Vds of Q1 and Q2) are needed in order to implement the selective freewheeling switch on-time adjustment or offsetting concepts as described above, with the controller 8 selectively performing additive offsetting or adjustment of a determined nominal freewheeling switch on-time in a given switching cycle for all phases if the detected or sensed active switch drain-source voltage exceeds a threshold TH or selective subtractive adjustment for all phases if the active switch drain-source voltage is negative. In this regard, the switching cycles of the first and second totem pole circuits may be out of phase with one another (e.g., phase shifted by 180° in one example), with the controller 8 selectively offsetting the freewheeling switch non-times for the respective totem pole circuits accordingly based on the measurement of the active switch drain-source voltage for a single one of the totem pole circuits. Moreover, the illustrated PFC converter 2a of FIG. 14 may also include current transformers providing switching circuit current signals or values CT1 and/or CT2 as illustrated, which may be used by the controller 8 for cycle-by-cycle current limit and/or over current protection, although the current transformers CT may be omitted in certain embodiments.

The above examples are merely illustrative of several possible embodiments of various aspects of the present disclosure, wherein equivalent alterations and/or modifications will occur to others skilled in the art upon reading and understanding this specification and the annexed drawings. In addition, although a particular feature of the disclosure may have been disclosed with respect to only one of multiple implementations, such feature may be combined with one or more other features of other embodiments as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

What is claimed is:

1. A controller for controlling a bridgeless totem pole power factor correction (PFC) converter, the controller comprising:
   a driver circuit operative to provide switching control signals to selectively operate first and second switches of the PFC converter in each of a plurality of switching cycles;
   a detection circuit coupled with first and second AC input nodes of the PFC converter and operative to detect positive and negative AC input half cycles based at least partially on a voltage polarity at the first and second AC input nodes;
   a selection circuit operative to designate the first switch as an active switch and designate the second switch as a freewheeling switch for negative AC input half cycles, and designate the second switch as the active switch and designate the first switch as the freewheeling switch for positive AC input half cycles;
   a sensing circuit operative to sense a voltage across the designated active switch following turn off of the designated freewheeling switch for a given switching cycle;
   a control circuit operative to:
      compute a nominal freewheeling switch on-time for the given switching cycle at least partially according to a Volt×Second balancing relationship using an active switch on-time for the given switching cycle, and
      selectively offset the nominal freewheeling switch on-time for the given switching cycle based at least partially on the voltage across the designated active switch for the given switching cycle to provide a computed freewheeling switch on-time for a next switching cycle; and a pulse circuit operative to provide an active switching pulse signal to the driver circuit to actuate the designated active switch for the active switch on-time in the given switching cycle, and to provide a freewheeling switching pulse signal to the driver circuit to actuate the designated freewheeling switch for the computed freewheeling switch on-time for the next switching cycle to facilitate zero voltage switching of the designated active switch.

2. The controller of claim 1, wherein the sensing circuit is operative to sense the voltage across the designated active switch a predetermined time following turn off of the designated freewheeling switch for the given switching cycle.

3. The controller of claim 1, wherein the control circuit is operative to selectively offset the nominal freewheeling switch on-time for the given switching cycle by adding a first predetermined offset time to the nominal freewheeling switch on-time to provide the computed freewheeling switch on-time for the next switching cycle when the voltage across the designated active switch for the given switching cycle is greater than a positive threshold.

4. The controller of claim 3, wherein the control circuit is operative to selectively offset the nominal freewheeling switch on-time for the given switching cycle by subtracting a second predetermined offset time from the nominal freewheeling switch on-time to provide the computed freewheeling switch on-time for the next switching cycle when the voltage across the designated active switch for the given switching cycle is negative.

5. The controller of claim 4, wherein the first and second predetermined offset times are equal.

6. The controller of claim 4, wherein the control circuit is operative to provide the computed freewheeling switch on-time for the next switching cycle as the nominal freewheeling switch on-time for the given switching cycle when the voltage across the designated active switch for the given switching cycle is greater than or equal to 0 and less than or equal to the positive threshold.

7. The controller of claim 6, wherein the sensing circuit is operative to sense the voltage across the designated active switch a predetermined time following turn off of the designated freewheeling switch for the given switching cycle.

8. The controller of claim 6, wherein the control circuit is operative to selectively wait to turn on the designated active switch until the voltage across the designated active switch is greater than or equal to 0.

9. The controller of claim 6, wherein the control circuit is operative to compute the nominal freewheeling switch on-time for the given switching cycle as a product of an absolute value of the voltage at the first and second AC input nodes and the active switch on-time in the given switching cycle divided by a difference between the absolute value of the voltage at the first and second AC input nodes and an output voltage.

10. The controller of claim 4, wherein the control circuit is operative to selectively wait to turn on the designated active switch until the voltage across the designated active switch is greater than or equal to 0.

11. The controller of claim 1, wherein the control circuit is operative to compute the nominal freewheeling switch on-time for the given switching cycle as a product of an absolute value of the voltage at the first and second AC input nodes and the active switch on-time in the given switching cycle divided by a difference between the absolute value of the voltage at the first and second AC input nodes and an output voltage.

12. The controller of claim 1, wherein the driver circuit is operative to provide switching control signals to selectively operate third and fourth switches of a second output phase of an interleaved PFC converter in each switching cycle.

13. The controller of claim 1, comprising:
a first return circuit control output operative to provide a first return control output signal to activate a first return circuit switch of the PFC converter for negative AC input half cycles; and
a second return circuit control output operative to provide a second return control output signal to activate a second return circuit switch of the PFC converter for positive AC input half cycles.

14. A bridgeless totem pole power factor correction (PFC) conversion system, comprising:
a totem pole switching circuit, comprising a first switch coupled between a first DC output node and a first internal node, and a second switch coupled between the first internal node and a second DC output node;
an inductor coupled between a first AC input node and the first internal node;
a return circuit, comprising a first return circuit component coupled between the first DC output node and a second AC input node, and a second return circuit component coupled between the second AC input node and the second DC output node; and
a controller operative to:
detect positive and negative AC input half cycles based at least partially on a voltage polarity at the first and second AC input nodes,
designate the first switch as an active switch and designate the second switch as a freewheeling switch for negative AC input half cycles, and designate the second switch as the active switch and designate the first switch as the freewheeling switch for positive AC input half cycles,
provide an active switching control signal to actuate the designated active switch for an active switch on-time in each of a plurality of switching cycles, and
for each given switching cycle:
compute a nominal freewheeling switch on-time for a given switching cycle at least partially according to a Volt×Second balancing relationship using the active switch on-time for the given switching cycle,
selectively offset the nominal freewheeling switch on-time for the given switching cycle based at least partially on a voltage across the designated active switch for the given switching cycle to provide a computed freewheeling switch on-time for a next switching cycle, and
provide a freewheeling switching control signal to actuate the designated freewheeling switch for the computed freewheeling switch on-time for the next switching cycle.

15. The PFC conversion system of claim 14, wherein the controller is operative to:
selectively offset the nominal freewheeling switch on-time for the given switching cycle by adding a first predetermined offset time to the nominal freewheeling switch on-time to provide the computed freewheeling switch on-time for the next switching cycle when the voltage across the designated active switch for the given switching cycle is greater than a positive threshold;

selectively offset the nominal freewheeling switch on-time for the given switching cycle by subtracting a second predetermined offset time from the nominal freewheeling switch on-time to provide the computed freewheeling switch on-time for the next switching cycle when the voltage across the designated active switch for the given switching cycle is negative; and provide the computed freewheeling switch on-time for the next switching cycle as the nominal freewheeling switch on-time for the given switching cycle when the voltage across the designated active switch for the given switching cycle is greater than or equal to 0 and less than or equal to the positive threshold.

16. The PFC conversion system of claim 15, wherein the controller is operative to sense the voltage across the designated active switch a predetermined time following turn off of the designated freewheeling switch for the given switching cycle.

17. The PFC conversion system of claim 15, wherein the controller is operative to selectively wait to turn on the designated active switch until the voltage across the designated active switch is greater than or equal to 0.

18. The PFC conversion system of claim 14, wherein the controller is operative to compute the nominal freewheeling switch on-time for the given switching cycle as a product of an absolute value of the voltage at the first and second AC input nodes and the active switch on-time in the given switching cycle divided by a difference between the absolute value of the voltage at the first and second AC input nodes and an output voltage.

19. A method for controlling a bridgeless totem pole power factor correction (PFC) converter, the method comprising:

turning on an active switch of the PFC converter for an active switch on-time in each of a plurality of switching cycles;

determining a nominal freewheeling switch on-time for a given switching cycle at least partially according to a Volt×Second balancing relationship using the active switch on-time for the given switching cycle;

selectively adding a first predetermined offset time to the nominal freewheeling switch on-time for the given switching cycle to provide a computed freewheeling switch on-time for the next switching cycle when a voltage across the active switch for the given switching cycle is greater than a positive threshold;

selectively subtracting a second predetermined offset time from the nominal freewheeling switch on-time for the given switching cycle to provide the computed freewheeling switch on-time for the next switching cycle when the voltage across the active switch for the given switching cycle is negative;

providing the computed freewheeling switch on-time for the next switching cycle as the nominal freewheeling switch on-time for the given switching cycle when the voltage across the active switch for the given switching cycle is greater than or equal to 0 and less than or equal to the positive threshold; and turning on a freewheeling switch of the PFC converter for the computed freewheeling switch on-time for the next switching cycle.

20. The Method of claim 19, comprising selectively waiting to turn on the designated active switch until the voltage across the designated active switch is greater than or equal to 0.

* * * * *